March 2, 1965     J. G. BALLINGER     3,171,962
ATMOSPHERIC DENSITY RESPONSIVE APPARATUS
Filed Feb. 12, 1962
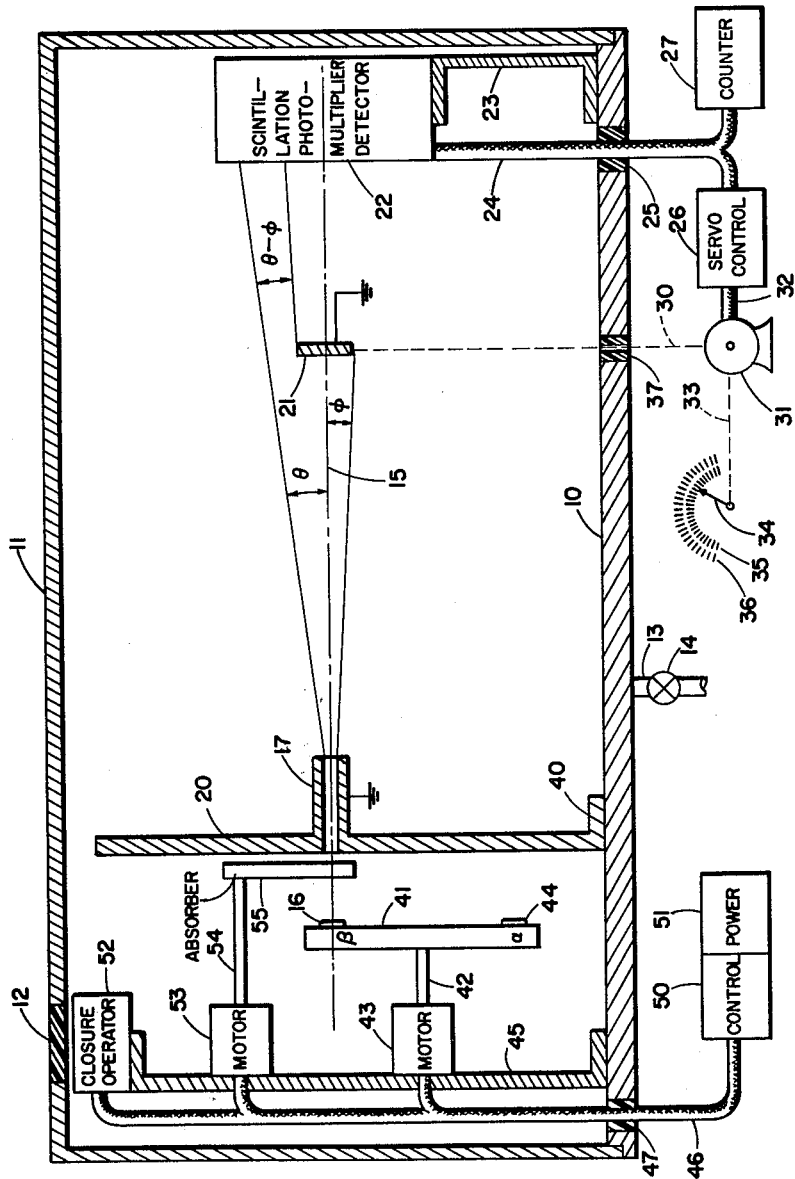
INVENTOR.
JOHN G. BALLINGER
BY
ATTORNEY.

United States Patent Office 3,171,962
Patented Mar. 2, 1965

3,171,962
ATMOSPHERIC DENSITY RESPONSIVE
APPARATUS
John G. Ballinger, Afton, Minn., assignor to Honeywell
Inc., a corporation of Delaware
Filed Feb. 12, 1962, Ser. No. 172,561
1 Claim. (Cl. 250—83.3)

This invention relates to the field of measuring instruments, and more particularly to instruments for measuring gas density, either as a quantity of direct interest or as a parameter of some other quantity such as altitude. A typical use of the invention is as an altimeter in the range of 200,000 to 500,000 feet or higher although by suitable design changes it can operate at lower altitudes. An object of the invention is to provide improved apparatus which gives a signal indicative of the density of a gas, especially where the density to be measured has extremely low values, and which is relatively unaffected by ionization in the gas being measured, especially valuable in measurements at high altitudes where a large number of free ions are present.

Various other objects, advantages, and features of novelty which characterize my invention are pointed out with particularity in the claim annexed hereto and forming a part hereof. However, for a better understanding of the invention, its advantages, and objects attained by its use, reference should be had to the drawing, which forms a part hereof, and to the accompanying descriptive matter, in which I have illustrated and described a preferred embodiment of my invention.

The single figure of the drawing shows the invention schematically. It is seen to comprise a base plate 10 and a cover 11 which together form a housing for the sensing portions of the instrument. Cover 11 is shown as including a frangible portion 12 which may be broken to place the inside of the housing in communication with the ambient air: the entire cover may be frangible if desired, since for high altitude measurements within the earth's atmosphere the instrument should be as open to the ambient atmosphere as possible. For use of the instrument in manned vehicles an alternative port 13 controlled by a valve 14 may be provided for opening the housing to the ambient atmosphere when this is desirable.

Aligned along an axis 15 in the housing are a source 16 of $\beta$ particles, a collimator 17 and shield 20, a target or mask 21, and a scintillation photomultiplier detector 22, or preferably a solid state scintillation detector. Detector 22 is mounted on a bracket 23, and a cable 24 passes through a seal 25 in base plate 10 for energizing the detector and bringing out its signal to a servo control 26 and a counter 27 which may be used alternatively. The angle subtended at collimator 17 by detector 22 is of the order of 15 degrees.

As is well known, a scintillation multiplier detector has a threshold level below which no operation takes place: thus particles with only thermal energy such as ions do not affect the detector.

Target 21 is of smaller area than detector 22, and is arranged for mechanical movement along axis 15 by a connection 30 to a motor 31 energized from servo control 26 through a cable 32: motor 31 also acts through a mechanical connection 33 to drive an index 34 with respect to a fixed scale carrying a first set of graduations 35 and a second set of graduations 36. Mechanical connection 30 passes through a suitable seal 37, and the track and associated drive means for target 21, which may be entirely conventional, are not shown in detail. It will be appreciated that motor 31 may be located within the housing if this is desired.

Collimator 17 is mounted on shield 20, which in turn is provided with a mounting foot 40 for supporting it on base plate 10. Source 16 is mounted on an arm 41 carried on the shaft 42 of a motor 43, and is normally positioned on axis 15 so that some of the $\beta$ particles emitted are transmitted in the direction of the axis as a slender beam of particulate energy. The arrangement is such that for a particular position of target 21, and for a particular low gas density in the housing, the area of the target coincides substantially with the cross section of the beam: if the target is too close to the collimator the beam does not cover the target, while if the target is too far from the collimator it does not completely mask the detector and some particles from source 16 reach the detector.

With the target at such a position as to coincide with the cross section of the beam, if the gas density in the chamber in the housing increases, scattering of the $\beta$ particles takes place, so that some of them pass the edge of the target and impinge on the detector. This scattering effect increases with increasing gas density, and constitutes the basis for the successful operation of my apparatus.

By energization of motor 43, arm 41 may be rotated to bring a second source of particulate energy, identified by numeral 44, into alignment with collimator 17, thus substituting source 44 for source 16, to provide a different level of energization for the apparatus: for example source 44 may emit $\alpha$ particles rather than $\beta$ particles.

Motor 43 is carried on a bracket 45 and is energized through a cable 46 which traverses a seal 47 in base plate 10 and is connected through a control unit 50 to a power source 51. Also carried on bracket 45 and energized through cable 46 may be a closure operator 52, for breaking the frangible portion 12 of cover 11, and a second motor 53 having a shaft 54 on which is eccentrically mounted a member 55 made of material which partially absorbs particulate energy. The energization of the apparatus from either source may thus be set at either of two levels, depending upon whether absorber 55 is or is not interposed between the source and the collimator. A maximum of four scales may thus be made available for index 34: ordinarily two are sufficient.

It will be appreciated that when the apparatus is to be used in a manned vehicle valve 14 replaces operator 52, and motors 43 and 53 may be replaced by simple manual knobs. It will also be appreciated that when the apparatus is to be used as a simple gas densimeter the manual operators will ordinarily be sufficient.

Servo control 26 may be of any suitable type: for many applications a simple system is adequate in which motor 31 is continuously energized at a first level to drive target 21 towards detector 22 and is energized at a higher level, as long as detector 22 is giving an output, to drive the target or mask away from the detector. The system settles down to a hunt of small amplitude centered about the position of target 21 which just masks the detector completely. Motor 31 may also drive a synchro or other repeater for giving at a distance an indication of the motor position.

Counter 27 may also be of any convenient configuration, and by way of example may give a digital pulse output and reset itself each time a predetermined count is reached: this arrangement is advantageous where the indication of the apparatus are to be transmitted from the vehicle to the ground by telemetry, which may also be used to actuate operator 52 and motors 43 and 53.

The operation of the apparatus will be first described in a preferred application, that of determining the altitude of an unmanned vehicle of the rocket type. The apparatus is assembled, sealed, and then evacuated to as high a vacuum as can be obtained. This step minimizes difficulties due to outgassing. Target 21 is set at a predetermined position and servo control 26 is de-energized, counter 27 being used in this application.

When the rocket is fired the intended trajectory is known and also the time required to reach any point on the trajectory. Members 22, 26, 27, and 51 are energized at such times that the apparatus will be warmed up and in operating condition when needed, and closure operator 12 is energized by control 50 the proper number of seconds after takeoff to initiate operation of the system. This ordinarily takes place near the apogee of the trajectory, where the ambient gas density is as small as it will get: under these circumstances arm 41 may be as shown and absorber 55 may be retracted.

A few of the β particles from source 16 reach detector 22 and counter 27 gives a low count, which may be recorded in the vehicle or telemetered to a ground station by conventional means, not shown. As the vehicle continues along its downward trajectory the gas density along axis 15 increases and increased scattering of the β particles takes place, so that an increase in energization of detector 22 results in an increasing count from counter 27.

After an interval the gas density has risen to the point where the maximum counting rate of counter 27 is approached. This interval can be predetermined, and at the appropriate time motor 53 may be enrgized by control 50 to insert absorber 55, thus reducing the count and changing the scale factor of the instrument.

For a manned vehicle, counter 27 is not used, and the servo control 26 is energized. Initially target 21 is as far toward detector 22 as it will go, and when valve 14 is opened a considerable number of the β particles reach the detector. Motor 31 is energized to drive target 21 toward collimator 17 until energization of detector 22 is just cut off, at which point index 34 may be read on scale 35. As the vehicle descends target 22 must be moved closer and closer to collimator 17: when it reaches the end of its travel index 34 has reached the end of scale 35. The pilot now causes absorber 55 to be inserted: motor 31 drives to the other end of its track, and indications are read on scale 36.

If the apparatus is to be used on vehicles of the satellite type, no cover 11 needs to be provided, since there will be plenty of time for outgassing to take place. In this application servo 26 and motor 31 ordinarily will not be needed.

A great advantage of my arrangement over previous apparatus is to be found in the fact that no accelerating voltages are required on target 21 or detector 22: thus the relatively high degree of dissociation and ionization of air molecules known to exist at high altitudes is of relatively little consequence.

Numerous objects and advantages of my invention have been set forth in the foregoing description, together with the details of the structure and function of the invention, and the novel features thereof are pointed out in the appended claim. The disclosure, however, is illustrative only, and I may make changes in detail, especially in matters of shape, size, and arrangement of parts, within the principle of the invention, to the full extent indicated by the broad general meaning of the terms in which the appended claim is expressed.

I claim as my invention:

Gas density responsive apparatus comprising, in combination: sensing means for giving an output determined by the particulate energy impinging thereon; source means directing, along an axis passing through said sensing means, a beam of particulate energy susceptible of scattering in the presence of ambient gas, so that the cross sectional area of the beam is a function of the ambient gas pressure and of the distance along the axis; means mounting said sensing means and said source means in fixed axial relationship, so as to render said function of distance invariant; masking means of fixed dimensions; support means mounting said masking means between said sensing means and said source means for movement only parallel to said axis, so that the effective masking area of said masking means varies in accordance with its displacement from said sensing means; servo means connected to said sensing means and said support means for repositioning said masking means in accordance with the output of said sensing means, whereby to nullify the effect, at said sensing means, of any change in the effective area of said beam caused by change in the density of the ambient gas; and output means actuated by said servo means.

References Cited by the Examiner
UNITED STATES PATENTS

| | | | |
|---|---|---|---|
| 2,467,812 | 4/49 | Clapp | 250—83.4 |
| 2,469,206 | 5/49 | Rich | 250—83.4 |
| 2,744,697 | 5/56 | Van Allen | 250—83.6 |
| 2,908,819 | 10/59 | Marx | 250—43.5 |
| 3,025,396 | 3/62 | Laughlin | 250—71.5 |

OTHER REFERENCES

Beta Backscatter Measures Altitude, Nucleonics, vol. 18, No. 3, March 1960, p. 124.

Gaging Gas Density With Fast Charged Particles by Schumacher, Nucleonics, vol. 18, No. 10, October 1960, pages 106, 109, 110, 112, 114.

RALPH G. NILSON, *Primary Examiner.*